L. M. CHAFFIN.
LAND LEVELING MACHINE.
APPLICATION FILED AUG. 14, 1917.

1,281,910.

Patented Oct. 15, 1918.
2 SHEETS—SHEET 1.

Louis M. Chaffin
INVENTOR

BY J. M. Thomas
ATTORNEY

L. M. CHAFFIN.
LAND LEVELING MACHINE.
APPLICATION FILED AUG. 14, 1917.

1,281,910.

Patented Oct. 15, 1918.
2 SHEETS—SHEET 2.

Louis M Chaffin
INVENTOR

BY J M Thomas
ATTORNEY

UNITED STATES PATENT OFFICE.

LOUIS M. CHAFFIN, OF TORREY, UTAH.

LAND-LEVELING MACHINE.

1,281,910. Specification of Letters Patent. Patented Oct. 15, 1918.

Application filed August 14, 1917. Serial No. 186,235.

*To all whom it may concern:*

Be it known that I, LOUIS M. CHAFFIN, a citizen of the United States, residing at Torrey, in the county of Wayne and State of Utah, have invented certain new and useful Improvements in Land-Leveling Machines, of which the following is a specification.

This invention relates to improvements in land leveling machines, and in carrying out my invention it is my purpose to provide a leveler with a wheeled platform upon which the driver is seated, and which platform is hingedly connected with the scraper element of the invention. The scraper is provided with means accessible to the driver whereby it may be tilted to the desired position, and also further provided with means attached to the wheeled platform whereby braking means may be operated to brake the wheeled portion of the machine and to bring the scraper element into loading position.

A further object of the invention is to provide a scraper which may be easily and quickly held at any desired inclination with relation to the land on which the scraper is working.

A further object is to provide wear and carrying shoes on the under portion of the scraper element, which may be adjusted to regulate the amount of earth carried by the scraping element.

With the above and other objects in view, the improvement consists in the construction, combination and arrangement of parts as described in the specification, and especially pointed out in the appended claims.

These objects are secured by the machine illustrated in the accompanying drawing, in which similar letters and numerals of reference indicate like parts throughout the several figures, and, as described in the specification forming a part of this application. In the drawings, in which I have shown a substantial embodiment of my invention, Figure 1 is a view in perspective of the machine with the scraping element set in position to engage and cut the soil.

Figures 4, 5, 6:
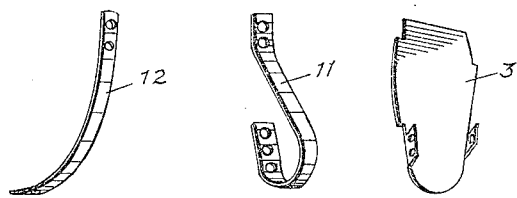

Fig. 4 is a view in perspective of one of the adjustable shoes. Fig. 5 is a view in perspective of one of the shoe braces. Fig. 6 is a view in perspective of one of the scraper end pieces and braces.

In the present invention the scraper is shown at 1, and is slightly curved and may be made of any desired dimensions, and has its lower edge beveled, and provided with a knife or cutting member 2. The knife member 2 extends the length of the scraper and the ends of the said scraper are provided with circular shaped side braces and ends 3. The said knife member is provided with a plurality of openings therein through which bolts are passed to allow it to be rigidly secured to the scraper back and yet adjusted in relation thereto. The scraper back is reinforced by transverse straps of metal 7, to which the braking elements are secured and other straps 27 are provided on the front of said scraper body.

The upper ends of said straps 27 are formed into one portion of the hinge, while the other portion of said hinge is secured on the end of the wheeled frame A. Eye bolts 8 are fastened on the front face of the scraper to the said straps 27, and to which flexible elements, in the nature of chains 9 are secured, and to which the draft animals are hitched.

Figures 1, 2:
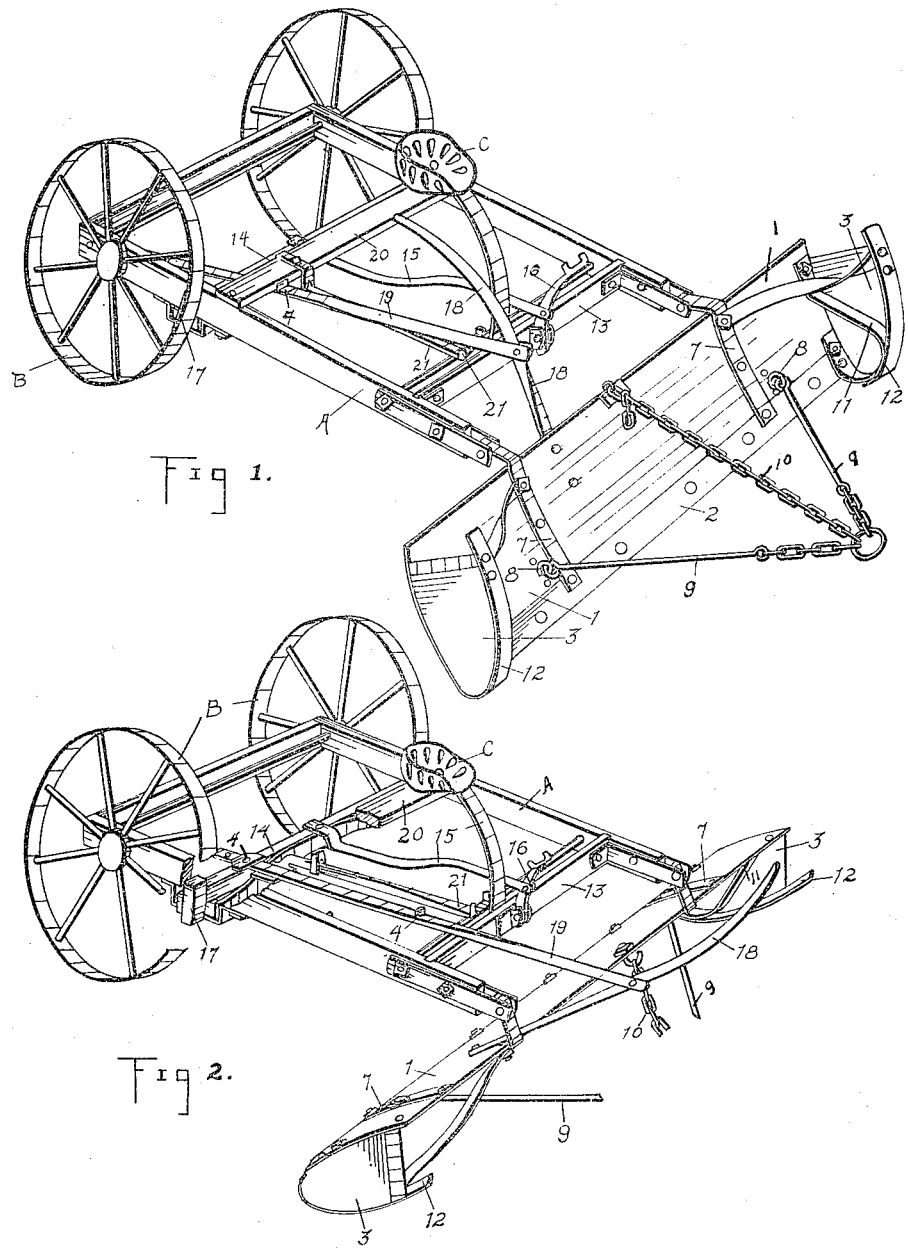
Fig. 2 is a perspective of the machine with the scraping element dumped and in position to scatter and level the soil.
Figure 3:
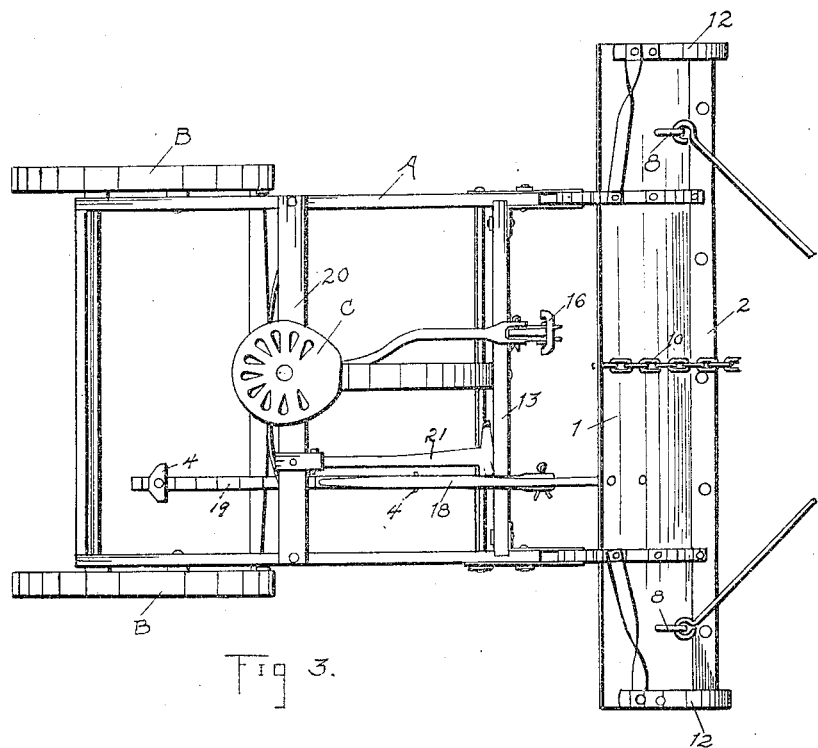
Fig. 3 is a plan view of the machine with the scraper in cutting position.

An adjusting chain 10 connects the upper edge of the scraper with the forward portion of the draft chains in order that the position of the draft attachment may be adjusted as the inclination of the scraper is changed. The sides of the scraper are formed of vertically placed sheets 3, which are bolted to the end portion of the scraper, and a curved brace 11 has one end bolted thereto and its other end is bolted to a shoe 12. Each end of the scraping element is provided with one of said shoes 12, which is curved to conform to the shape of said end piece 3, and is positioned so that when the scraper is dumped the scraping element will ride on the side face of said shoe 12. The said shoes 12 and said braces 11, have a plurality of perforations therein so that the position of the shoes 12 and braces 11 may be manually shifted and secured, in order that more or less space may be provided between the cutting edge of the knife 2 and the plane of the soil when dumped. The said wheel frame A is mounted on wheels B at its rear end and is hingedly connected with the upper edge of said scraper at its front end. The driver's seat C is provided on said frame A, and a foot brake 16 is pivoted to a cross piece 13 of said frame A. The brake beam 14 is carried on said frame and the brake rod 15 connects said brake beam 14 and foot brake 16. The ends of said brake beam 14 are provided with brake shoes 17 which engage the inner peripheric face of the wheels B. A hand lever 18 is pivoted to an adjustable brake rod 19, and on said rod 19 are two stop blocks 4. The said brake rod 19 is carried beneath a cross bar 20 that is fastened on said frame A. The foot lever 21 has one end pivoted to said cross bar 20, and has a portion, in the form of a right angled frame, which engages and presses said brake rod 19 against the lower side of said cross bar 20, to form a clutch. The brake rod 19, lever 18, foot lever clutch 21, and stop pieces 4 are the means I provide for controlling the inclination of the scraper; and when the scraper is to be dumped, I release the foot lever clutch 21 and the upper end of the lever 18 will be thrown forward by dumping. If I desire to scatter or spread out the load the clutch is to be released gradually. The scraper has a tendency when the machine is in motion to dump, and will do so unless held by the clutch. The other braking element consists of the foot brake 16, brake rod 15, brake beam 14; and shoes 17 may be used to retard the wheels B and to apply the draft to the wheeled portion of my machine. When the draft is so applied to the wheeled portion of my machine a forward movement will bring the scraper back in position to load, as shown in Fig. 1.

The operation of my machine is as follows: Desiring to load the scraper with a medium load, the draft chains 9 and adjusting chain 10 having been set to carry such load, the driver operates the foot brake 16 by pressing forward on said brake which causes the shoes 17 to engage the wheels. A forward movement of the machine will bring the scraper into cutting and loading position, as shown in Fig. 1, then I hold it in that position by pressing down on the foot lever clutch 21, and loading the scraper. When the scraper is carrying its load and desiring to scatter said load, the said foot lever clutch 21 is gradually released. The scraper will then dump and ride on the shoes 12, and the machine will assume the position shown in Fig. 2. By setting the wheel brakes a forward movement of the team will set the scraper in loading position, shown in Fig. 1. The inclination of the scraping element is regulated by the position of the lever 18, brake rod 19 with the foot lever clutch 21. The stop pieces 4 limit the movement of said rod 19.

Having thus described my invention, I desire to secure by Letters Patent and claim:—

1. A land leveling machine consisting of a scraper; a wheel supported frame pivoted to the upper edge of said scraper; chains adjustably fastened thereto by which the scraper and frame are drawn over the ground and filled; a brake on the wheels to turn said scraper into filling position consisting of wheel engaging shoes, a beam on which said shoes are secured, a foot lever and a rod connecting said lever and beam; means to hold said scraper in loading position and to release said scraper for dumping, said means consisting of hand lever, a brake rod pivoted thereto, and a clutch to hold said brake rod from longitudinal movement, or to release it for longitudinal movement.

2. A land leveling machine consisting of a scraper; a wheel supported frame pivoted to the upper edge of said scraper; means to set said scraper in loading position when the machine is moved forward said means consisting of a foot lever; a brake rod 15; a brake beam and shoes to engage said wheels; means to hold said scraper in loading position, said means consisting of a brake rod 19 and a lever clutch.

In testimony whereof I have affixed my signature.

LOUIS M. CHAFFIN.